(12) United States Patent
Lee et al.

(10) Patent No.: US 8,477,458 B2
(45) Date of Patent: Jul. 2, 2013

(54) SLIDER PAD FOR CONTACT MITIGATION

(75) Inventors: KiMyung Lee, Eden Prairie, MN (US); Ying Dong, Eden Prairie, MN (US); Catalin Ioan Serpe, Roseville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/356,168

(22) Filed: Jan. 23, 2012

(65) Prior Publication Data

US 2012/0127613 A1 May 24, 2012

Related U.S. Application Data

(62) Division of application No. 12/561,833, filed on Sep. 17, 2009, now Pat. No. 8,201,319.

(51) Int. Cl.
*G11B 5/60* (2006.01)

(52) U.S. Cl.
USPC ...................................... 360/236.3

(58) Field of Classification Search
USPC ............ 360/236.3, 235.7, 236, 235.6, 234.4, 360/234.2, 235.5, 236.1, 237.1, 235.8; 29/603.16, 603.06, 603.04
See application file for complete search history.

(56) References Cited

U.S. PATENT DOCUMENTS

| | | | |
|---|---|---|---|
| 5,841,608 A | 11/1998 | Kasamatsu et al. | |
| 6,212,042 B1 * | 4/2001 | Gui et al. ................... | 360/236.6 |
| 6,301,079 B1 | 10/2001 | Hanamoto et al. | |
| 6,504,681 B1 * | 1/2003 | Sawada ...................... | 360/235.6 |
| 6,535,353 B2 * | 3/2003 | Boutaghou et al. ........ | 360/235.1 |
| 6,538,849 B1 * | 3/2003 | Fayeulle et al. ............ | 360/236.3 |
| 6,707,631 B1 | 3/2004 | Haddock | |
| 6,785,093 B2 * | 8/2004 | Baba et al. ................. | 360/235.7 |
| 6,882,504 B2 | 4/2005 | Boutaghou et al. | |
| 6,920,019 B2 | 7/2005 | Martin et al. | |
| 6,993,824 B2 | 2/2006 | Childers et al. | |
| 7,027,265 B2 * | 4/2006 | Koishi ....................... | 360/235.6 |
| 7,110,220 B2 | 9/2006 | Ohwe | |
| 7,167,343 B2 | 1/2007 | Feliss et al. | |
| 7,259,045 B2 | 8/2007 | Dejima | |
| 7,385,786 B2 * | 6/2008 | Tokuyama et al. ........ | 360/236.3 |
| 7,724,474 B2 * | 5/2010 | Maejima et al. ........... | 360/237.1 |
| 2002/0018320 A1 * | 2/2002 | Levi et al. .................. | 360/236.3 |

* cited by examiner

*Primary Examiner* — Allen T Cao
(74) *Attorney, Agent, or Firm* — Hall Estill Attorneys at Law

(57) ABSTRACT

An apparatus and associated method for a slider pad that allows for contact to be mitigated without plastic deformation. Various embodiments of the present invention are generally directed to a slider that presents a transducer and has at least one air bearing surface (ABS) feature. The ABS feature comprises a pair of sidewalls spaced a distance X apart. A pad is deposited on the ABS feature so that the pad comprises a hemispherical cross-section and has a circumferential diameter greater than X.

20 Claims, 6 Drawing Sheets

FIG. 4A
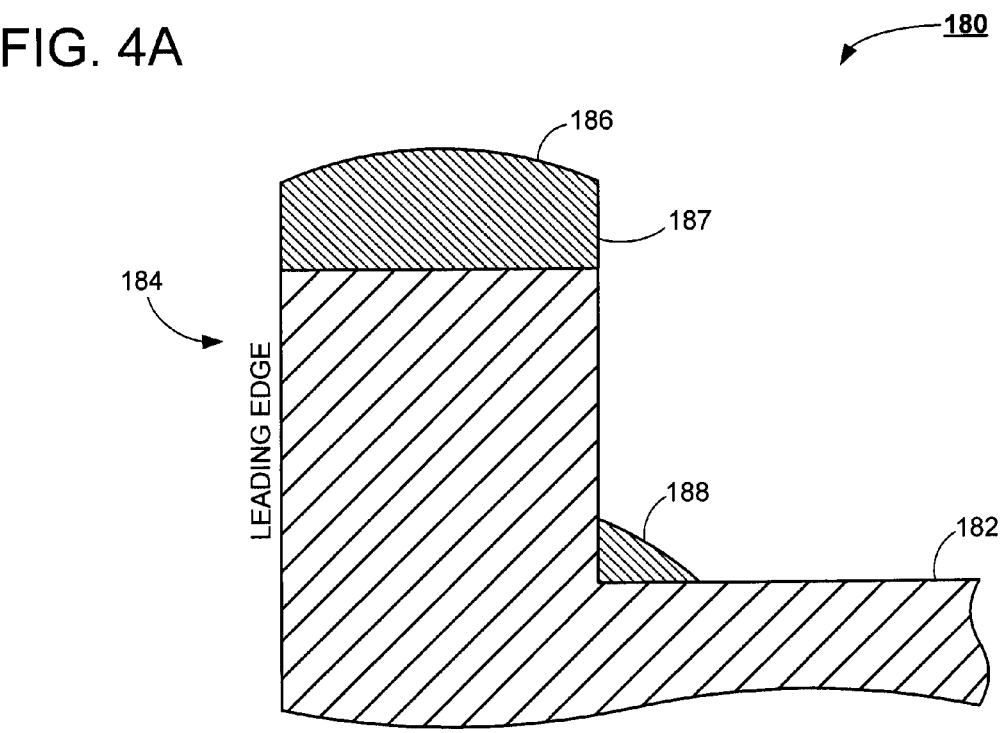
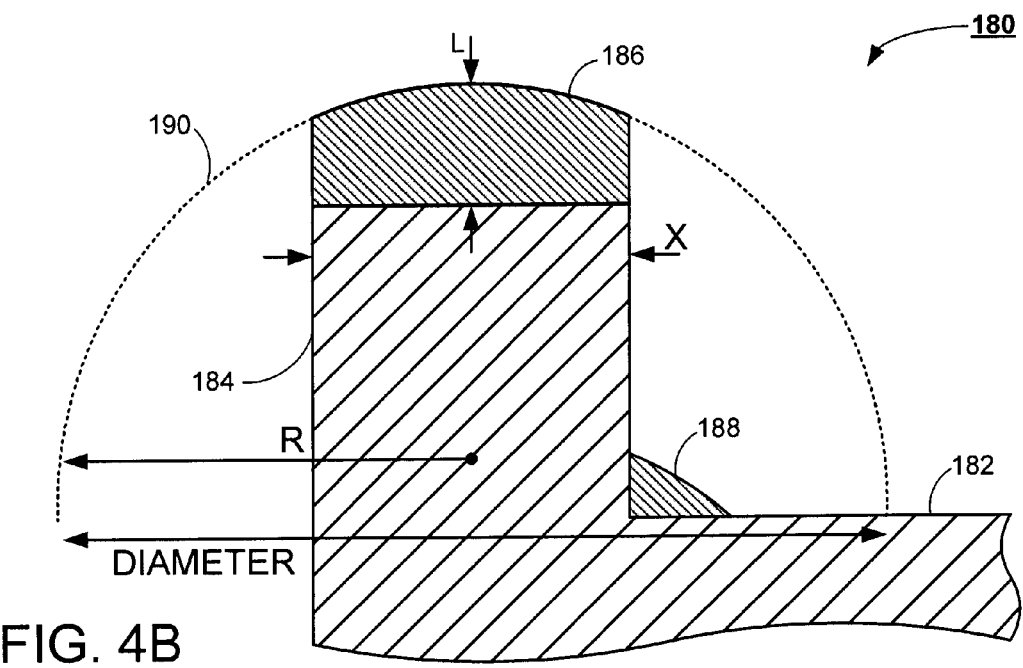
FIG. 4B

SLIDER PAD FOR CONTACT MITIGATION

SUMMARY OF THE INVENTION

Various embodiments of the present invention are generally directed to a slider pad that allows for contact to be mitigated without deformation on recording discs.

In accordance with various embodiments, a slider presents a transducer and has at least one air bearing surface (ABS) feature. The ABS feature comprises a pair of sidewalls spaced a distance X apart. A pad is deposited on the ABS feature and comprises a hemispherical cross-section that has a circumferential diameter greater than X.

In other embodiments, a slider that presents a transducer and has at least one air bearing surface (ABS) feature with a pair of sidewalls spaced a distance X apart is provided. A pad is deposited on the ABS feature and has a hemispherical cross-section that has a circumferential diameter greater than X. A contact is then mitigated between the pad and a media surface with elastic deformation.

In some embodiments, a slider that presents a transducer and has at least one air bearing surface (ABS) feature comprising a pair of sidewalls spaced a distance X apart is provided. A pad is then deposited on the ABS feature with a deposition process that uses only opaque mask layers so that the pad comprises a hemispherical cross-section and has a circumferential diameter greater than X.

These and other features and advantages which characterize the various embodiments of the present invention can be understood in view of the following detailed discussion and the accompanying drawings.

BRIEF DESCRIPTION OF THE DRAWINGS

FIGS. 4A and 4B display a cross-sectional representation of a portion of the slider of FIG. 3 in accordance with various embodiments of the present invention.

DETAILED DESCRIPTION

The present disclosure generally relates to the reading and writing of data to a memory space, and in particular to methods and architecture that may be used to improve the reliability of accessing selected portions of memory. Prior art mobile and consumer electronics data storage devices often experience specific failure modes related to head-media contact. Such failure modes can occur during operation of the electronic device, loading of hardware associated with device performance, and non-operational movement of the device that result in reduced reliability in association with data loss. Moreover, the various failure modes can vary in severity depending on the attitude and position of the head in relation to the media.

Accordingly, a slider pad that mitigates contact between a head and a media is disclosed herein that provides a pad with a hemispherical cross-section and a circumferential diameter greater than a width of an air bearing surface feature on which the pad is deposited. As such, the pad faces the media with a continuous edgeless surface that can mitigate contact exclusively with deformation that results in an unmodified head and media. As a result, operational characteristics of the data storage device are improved to incur less deformation and provide a reliable head-media interface.

Figure 1:
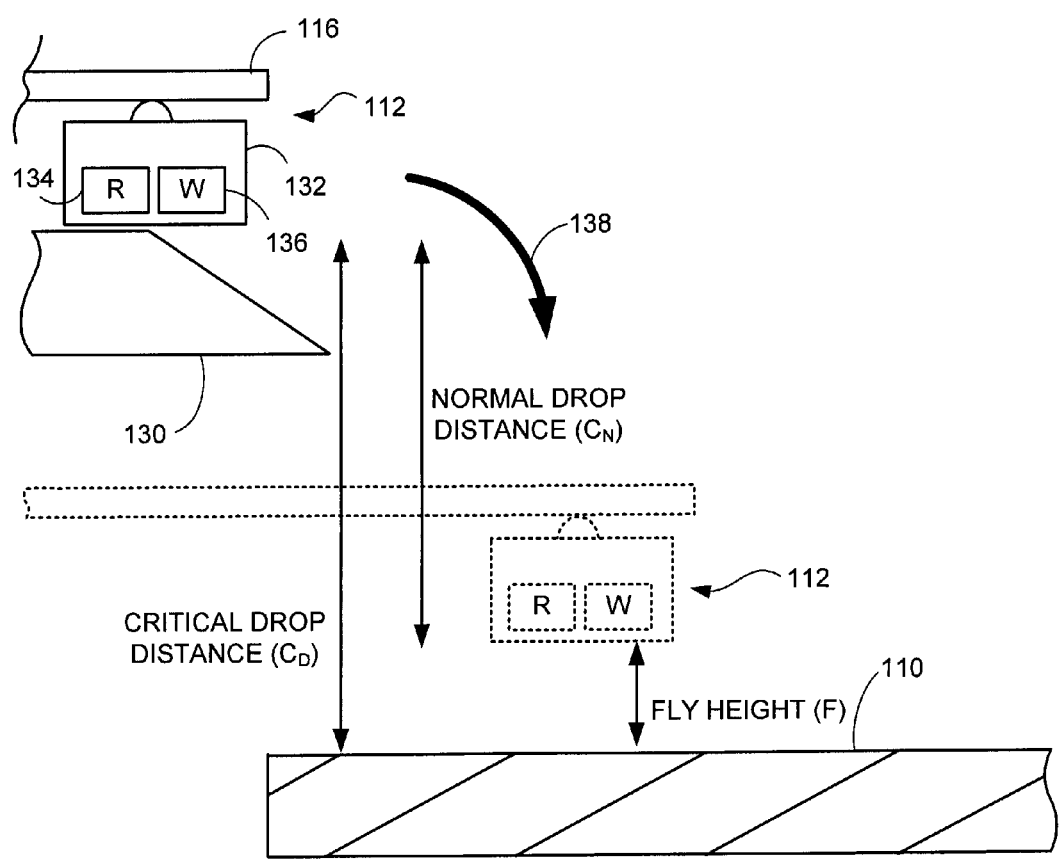
FIG. 1 shows an exemplary operation of relevant portions of the data storage device.

Turning to the drawings, FIG. 1 provides a side view representation of the interaction of a selected head gimbal assembly (HGA) 112 with the surface of an associated media 110. For reference, FIG. 1 is an operational view of the HGA 112 being loaded from a ramp structure 130. Here, the storage media 110 can be seen below the HGA 112, although it will be understood that such is not limiting.

As shown, the HGA 112 is gimbaled near a distal end of the flexible suspension 116, and includes a slider structure 132 configured to hydrodynamically interact with a flow of fluidic currents established by high speed rotation of the media 110. In an unloaded state, the HGA 112 is positioned on the ramp structure 130 so that the transducers 134 and 136 do not reside over any portion of the media 110.

As shown by arrow 138, when the HGA 112 is loaded, the slider 132 and transducers 134 and 136 drop to the operational fly height F adjacent to the media 110. As will be recognized, the suspension 116 provides a bias force upon the HGA 112 which is countered by the air bearing force induced by fluidic interaction of the moving air adjacent the media surface, resulting in stable flight of the slider 132 at the fly height F. In some embodiments, the distance of the transducer head 112 from the storage media 110 in an operating state will be on the order of a few tenths of a micron or less (μm, or $1\times10^{-6}$ meters).

It can be appreciated that the fly height of the HGA 112 can vary during operation, but the operational fly height as used herein is a predetermined distance above the media 110 which data operations are desirably conducted. While a normal drop distance ($C_N$) is desired and allows the HGA 112 to undergo operation upon reaching the operational fly height F, the HGA 112 can inadvertently drop a critical drop distance ($C_D$) in which portions of the HGA 112 contact the media 110. Such contact can result in plastic deformation in which both the media 110 and HGA 112 can be permanently deformed. In severe cases, the plastic deformation causes the loss of data at the point of impact and produces debris that can interfere with transducer operation.

It has further been observed that while the HGA 112 is in the loaded and operational state adjacent the media 110, any sudden motion (shock) can induce contact between portions of the HGA 112 and the media 110. Such operational shock can be as equally damaging as loading contact and result in similar reliability issues with permanent deformation of the media 110 and HGA 112. It should be noted that various other situations can result in contact between the HGA 112 and the media 110.

Figure 2A:
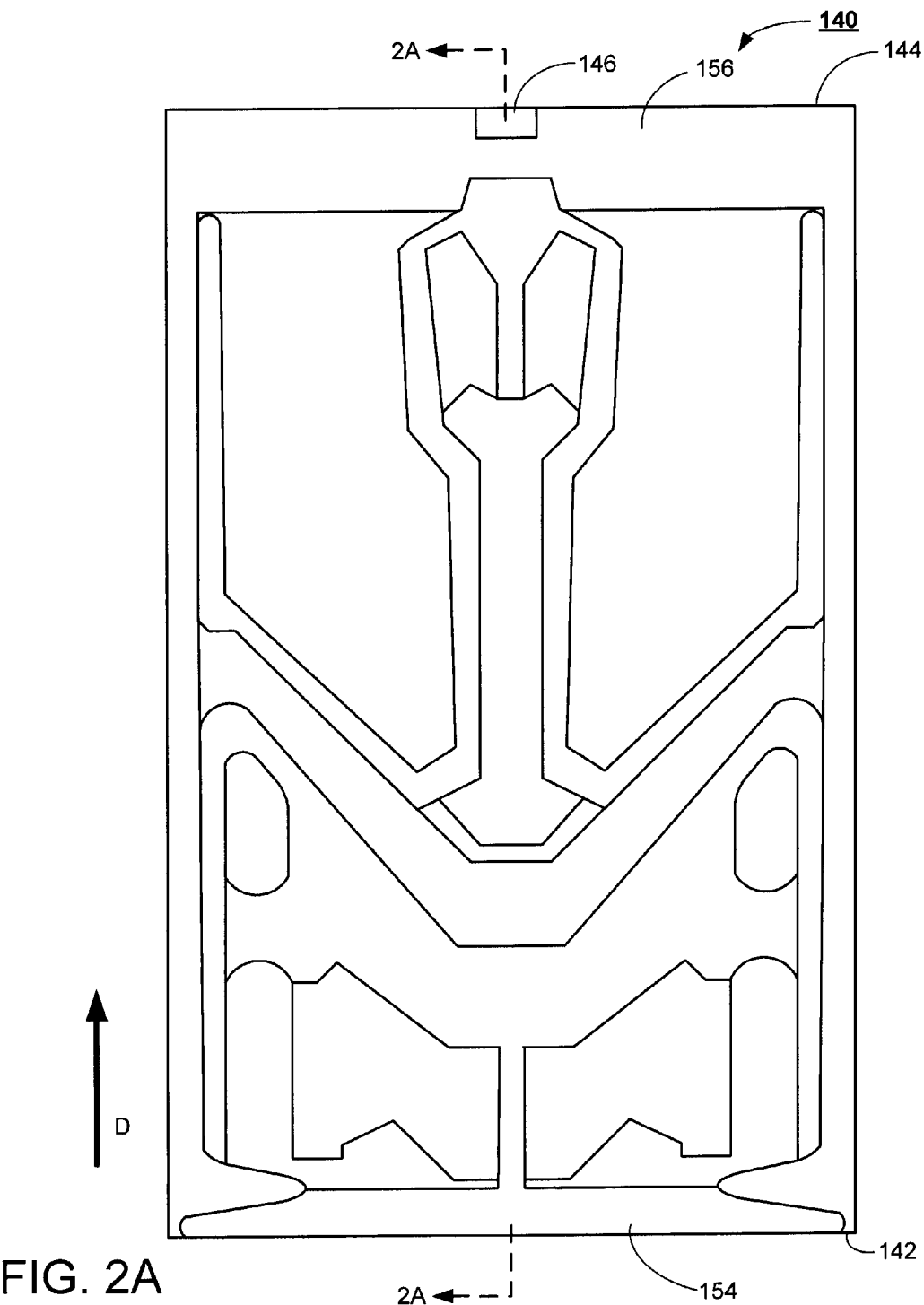
FIGS. 2A and 2B generally illustrate an exemplary slider.
Figure 2B:
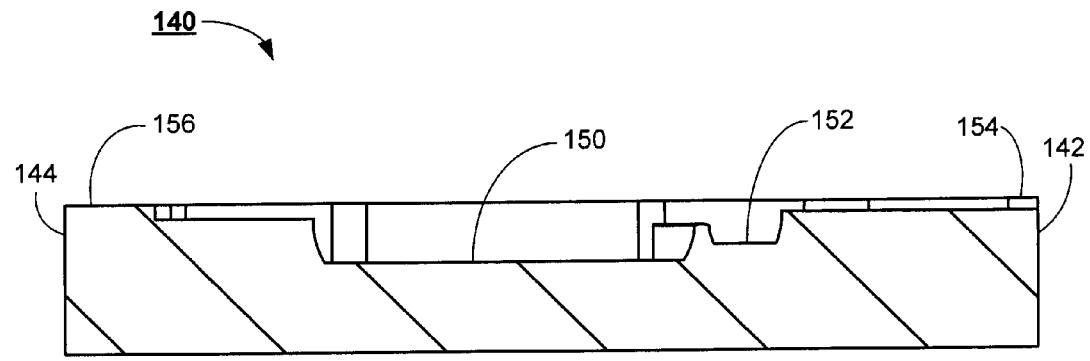

Referring now to FIG. 2A, a detailed plan view of a slider 140 is generally illustrated. For reference, FIG. 2B shows the side of the slider 132 of FIG. 1 that faces the storage media 110. The arrow D indicates the direction of travel of the medium 110 relative to the slider 140. FIG. 2B provides a cross-sectional view of FIG. 1 along lines 2A-2A.

It should be noted that while the arrow D indicates a generally longitudinal direction with respect to the axis of the slider 140, it is understood that the media 110 may have a degree of skewing with respect to the slider as the slider is positioned at different radii of the media by an actuator, such as the actuator 114 of FIG. 2A.

As shown, the slider 140 is generally rectilinear in shape. The slider 140 comprises a leading edge 142 and a trailing edge 144 that both correspond to the direction of rotation of the storage medium 110, as indicated by the arrow D. In various embodiments, the slider 140 includes a transducer 146 mounted on the trailing edge 144 and are capable of transferring data to and from a storage media. The transducer 146 may include a read element and a write element, but such configuration is not required or limited. Furthermore, no particular number or type of transducer 146 is required, some embodiments characterize the transducer 146 as a read element that is a magneto-resistive (MR) based element, and a write element 148 that is an inductive vertical recording element.

Further, a number of features can be constructed on the slider 140 to provide stability during operation over the media 110. As shown in FIG. 2B, the slider 140 can be constructed with air bearing (ABS) features such as rails 154 and 156 that provide rigidity and advantageous operational characteristics for close proximity to the media 110. However, the stability provided by the ABS features can be offset by the presentation of a rigid edge towards the media that can permanently modify the surface of the media with the slightest of contact.

As will be recognized, prior art HGA structures have been proposed in the art which generally provide several localized cushion areas to prevent permanent damage to a medium from contact with the slider. However, such structures are specifically designed to absorb contact after a drop from the operational fly height and while the HGA comes to rest while in contact with the media. While operable, the pressures and stresses resulting from contact while the HGA is loaded from a ramp structure can be considerably greater, and consequently more difficult to absorb, than the stresses observed when the HGA comes to rest on the surface.

Accordingly, various embodiments of the present invention provide at least one pad capable of mitigating contact from a drop distance greater than the operational fly height of the HGA. Such a pad has a continuous and edgeless spherical top surface that has a circumferential diameter greater than that of the air bearing surface feature (ABS) on which it is deposited. In operation, the pad can mitigate the increased pressures of a drop from a ramp structure by undergoing only elastic deformation.

Figure 3:
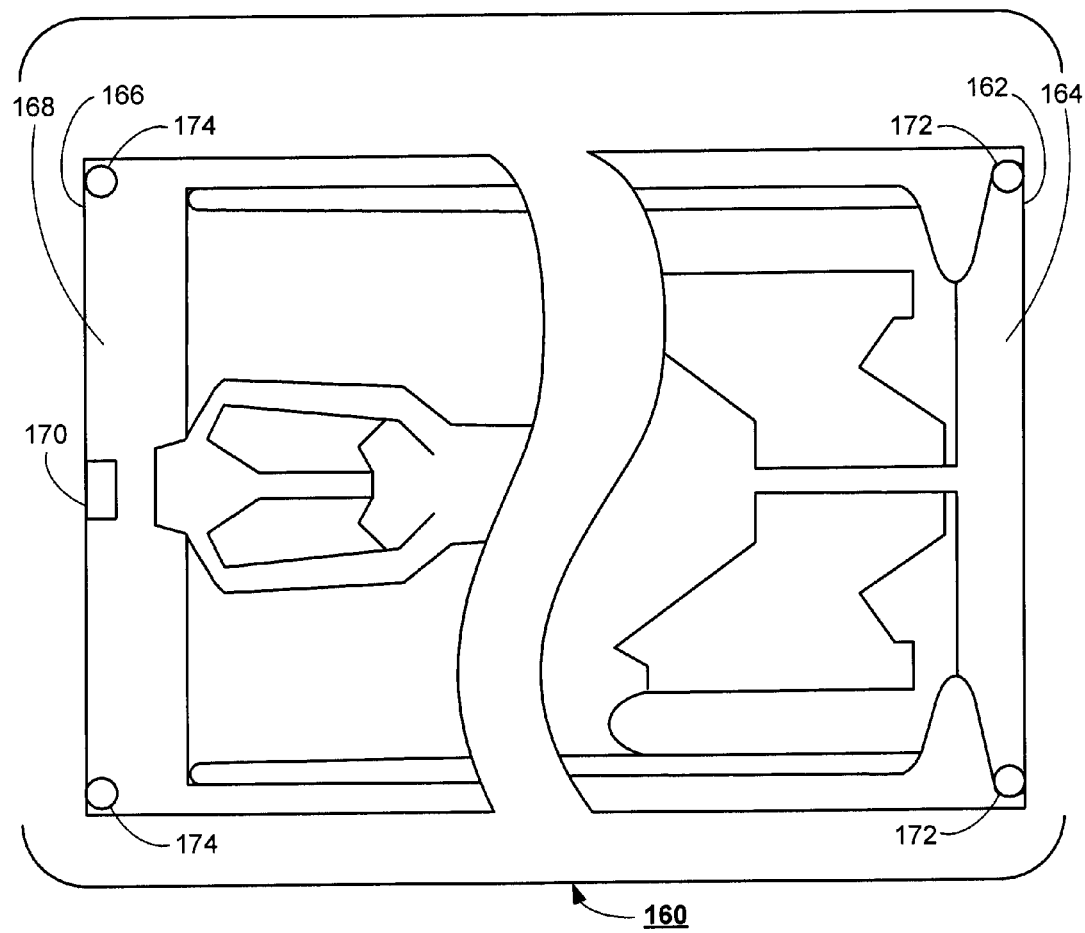
FIG. 3 shows an exemplary configuration of the slider of FIGS. 3-3A in accordance with various embodiments of the present invention.

FIG. 3 displays an exemplary slider 160 constructed and operated in accordance with various embodiments of the present invention. For reference, FIG. 4 shows a plan view of the bottom of the slider 160, which is the side that is presented to the surface of an associated media.

The slider 160 is shown with a leading edge 162 and a leading rail (or comb) 164 that each concurrently and initially receive fluidic flow created by rotation of an associated media. A trailing edge 166 is also present on the slider 160 and has a trailing rail 168 which supports at least one data transducing element 170.

In various embodiments, a plurality of leading pads 172 are deposited on the leading rail 164 while a plurality of trailing pads 174 are deposited on the trailing rail 168. While not required or limiting, a pad is shown deposited on each of the four corners of the slider 160 in order to provide contact mitigation throughout the surface of the slider 160. Further in various embodiments, the pads are deposited in a parallel configuration along the longitudinal and lateral axis of the slider 160 so that each of the leading pads 172 are equidistant from a center point of the slider 160.

It should be noted that the number, size, and orientation of the pads are not limited as pads can be located on any portion of the slider 160 expected to contact an associated media. For example, a first pad can be placed on a non-ABS milled surface of the slider 160 while a second pad is placed on a side portion of the trailing rail 168. However, it can be appreciated from FIG. 4 that each pad presents a continuous top surface that is edgeless and has an annular sidewall. Such configuration is consistent with a substantially spherical top surface constructed in various embodiments of the present invention.

In operation, one or more of the pads come into contact with an associated media and undergo elastic deformation to mitigate the pressures and stresses generated by the contact. The continuous and spherical top surface is allowed to deform to absorb the contact energy, but the deformation will remain elastic in nature due to the material and the specifically hemispherical cross-section of each pad. In some embodiments, each pad is made of a diamond-like carbon (DLC) that is softer than alternative coatings while exhibiting advantageous deformation properties. However, the pad material is not limited to DLC and can be constructed with various materials, as desired.

FIGS. 4A and 4B further depict a cross-sectional representation of relevant portions of FIG. 3. As shown, an ABS feature projects from a continuous region of the slider 182. However, the ABS feature is not required to be a continuous part of the slider 182. For example, the ABS feature can be any feature, such as a separate standoff or taper. A pad 186 is further shown deposited on the feature 184 so that the complete width of the feature 184 is occupied with the pad 186. Such width of the feature is more particularly displayed in FIG. 4B and defined by a distance X between the substantially vertical sidewalls of the feature 184.

Furthermore, the pad 186 has a substantially vertical annular sidewall 187 extending from the feature 184. The annual sidewall 187 can transition to the continuous and conformal profile of the top surface of the pad 186 that presents an edgeless surface to an associated media. In some embodiments, the pad 186 is characterized as spherical due to its hemispherical cross-section and the continuous and edgeless top surface, as shown by dotted line 190 in FIG. 4B. While in other embodiments, the pad 186 is particularly constructed with a circumferential diameter that is greater than the distance X between the sidewalls of the feature 184.

As displayed in FIG. 4B, a circumferential diameter greater than the width of the feature 184 provides a top surface of the pad 186 with a reduced curvature compared with a pad having a circumferential diameter equal to that of the feature width. That is, a pad with a circumferential diameter equal to the width of the feature 184 would have more profound curvature than the pad displayed in FIGS. 4A and 4B. As such, any contact between the pad 186 and an associated media would result in a more localized mitigation of stresses in the pad that could result in plastic deformation of both the media and pad 186. However, the curvature is not exclusively related to the circumferential diameter. Hence, the curvature can be modified with the thickness of the pad 186.

In some embodiments, the pad 186 is constructed of DLC which has a hardness that is approximately half of that of an alternative compounds, such as AlTiC. However, it should be noted that the hardness of AlTiC can vary based on the process used to deposit the material.

The ability to modify the thickness, hardness, and curvature of the pad 186 can advantageously allow for mitigation of large amounts of contact. For example, the pad 186 can be constructed with a large contact area and has no exposed edges that efficiently dissipate contact. Furthermore, the maximum contact pressure by Hertzian contact theory of the pad of FIGS. 4A and 4B is improved by the present design, as evidenced by equation 1:

$$p_0 = \left(\frac{6WE^2}{R^2\pi^3}\right)^{\frac{1}{3}} \quad (1)$$

in which W is the normal load, E is the reduced elastic modulus, and R is the reduced radius of curvature, the Hertzian contact pressure would be approximately 287 times smaller than the pad with the higher radius of curvature. However, it can be appreciated that Hertzian contact theory only predicts elastic behavior of material, so the actual contact pressure may not exactly match the currently calculated value. Nevertheless, the present calculations do indicate the lower severity of plastic deformation when the more spherical pad shown in FIGS. 4 and 4A is used to mitigate contact.

In addition, the configuration of the pad 186 of FIGS. 4A and 4B can be constructed in a variety of processes. Some such processes can be achieved with only opaque mask layers, such as a chemical vapor deposition (CVD). In contrast, a radius of curvature of such intricate dimensions could be created by a variety of grey scale masks in various processes, such as a half-tone mask exposed taper (HaMET) process. In such processes, a number of semi-transparent films are successively used to form a pre-determined patterned pad from light that passes through the half-tone mask. In operation, the use of a half-tone mask allows for manipulation of the thickness of deposited layers of material that form the patterned pad.

In addition, such a HaMET process often requires the use of time consuming optical equipment to create a radius of curvature. Conversely, a non-HaMET deposition process can use opaque masks to create a predetermined radius of curvature without concern for controlling light and transparency of making films. Thus, the current pad 186 can be deposited with a non-HaMET process that provides increased efficiency due to the elimination of numerous different steps and techniques.

In some embodiments, the pad 186 is deposited by a liftoff process that involves undercutting a photoresist layer that is deposited at an angle of approximately 45 degrees. In yet another embodiment, a layer of material is deposited and then etched back to form a spherical shape. Such deposited material can be in a grey scale that has a spherical shape that gets transferred to the underlying substrate after etching.

A result of the various deposition processes can be the creation of a secondary pad 188 concurrently with the pad 186. The secondary pad 188 fills a cavity region of the slider 182 where the substantially horizontal surface of the slider transitions to the substantially vertical sidewall of the ABS feature 184. As such, the secondary pad 188 can contact both the horizontal and vertical surfaces while having a continuous and edgeless top surface.

Figure 5A:
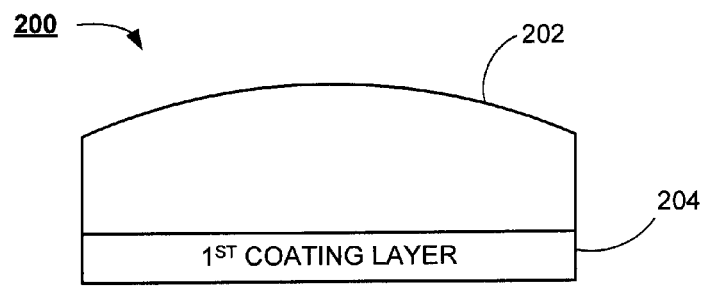
FIG. 5A provides a cross-sectional representation of an exemplary pad constructed in accordance with various embodiments of the present invention.

In FIG. 5A, another exemplary pad 200 is provided as constructed in accordance with various embodiments of the present invention. As displayed, a pad material 202 is deposited on a first coating layer 204. In some embodiments, the first coating layer 204 can be a DLC material that has been deposited and allowed to set before the DLC pad material 202 is applied. However, the materials and orientation of the two sections of the pad 200 are not limited and can be modified, as desired. For example, the material of the layer 204 can be modified with the inclusion of SiO2 and Alumina as well as with the deposition of DLC over the spherical pad.

Figure 5B:
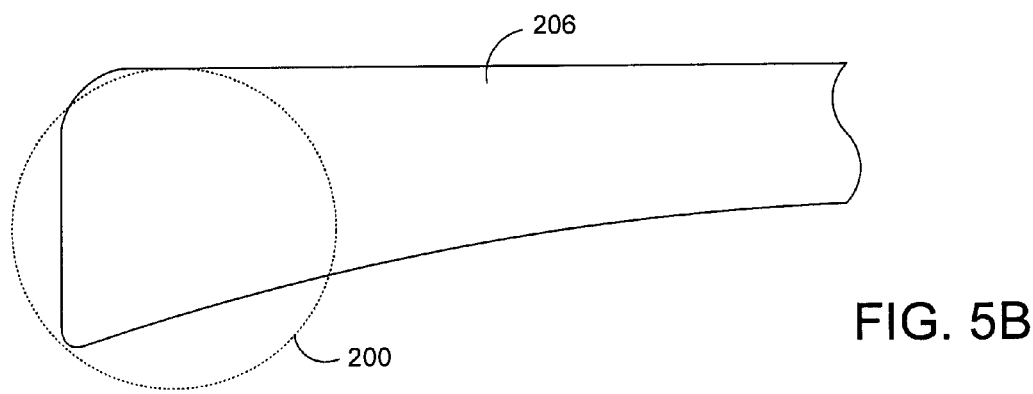
FIG. 5B provides an ABS view of an exemplary pad.

FIG. 5B provides a view of the exemplary pad 200 of FIG. 5 constructed on a portion of a slider, such as the slider 140 of FIGS. 2A and 2B. For reference, FIG. 5B shows a top view of a portion of the slider that faces a storage media. A leading edge of a slider can be an ABS feature 206 that has a continuous construction. The exemplary pad 200 can be deposited at any location along the ABS feature 206. As shown, the pad 200 is constructed with an annular sidewall that extends beyond the bounds of the ABS feature 206. However, in some embodiments, the pad 200 is positioned fully on the ABS feature 206 so that no portion of the pad 200 extends beyond the edges of the ABS feature 206. While the coating layer can be applied on the entire ABS feature 206, some embodiments apply the coating layer exclusively to the area of the ABS feature to which the pad 200 is deposited.

Figure 6:
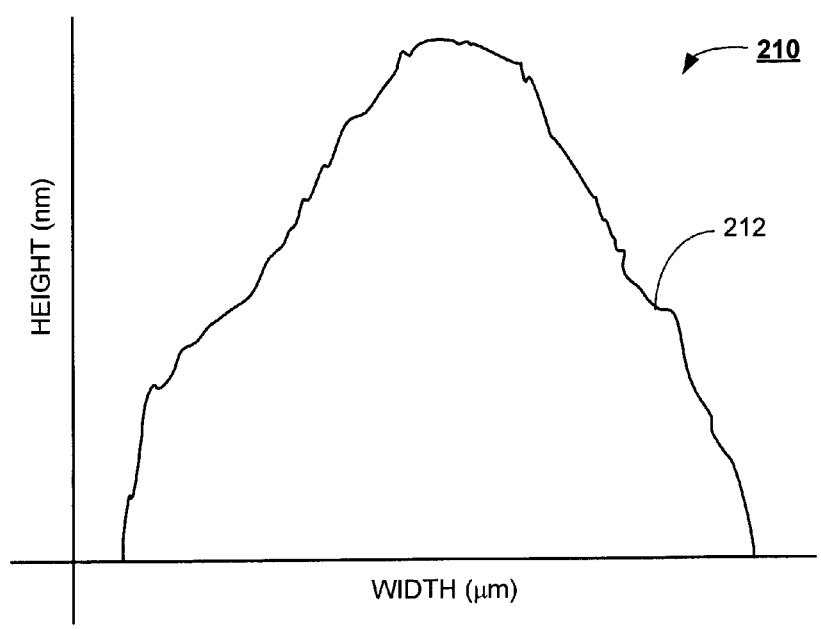
FIG. 6 graphs exemplary shape characteristics of the portions of the slider depicted in FIGS. 5A-6.

FIG. 6 graphs shape characteristics of an exemplary pad, such as the pads shown in FIGS. 4A-5B. The continuous radius of curvature and edgeless shape of the top surface of an exemplary pad is illustrated by the line 212. Various embodiments construct the exemplary pad with a diameter in the range of 5.6-9 micrometers while the height has a range of 158-308 angstroms. As such, the estimated radius of curvature ranges from 248-329 micrometers with an average of 244 micrometers. While these ranges can be used to construct various sized pads, such ranges are not exclusive and can be modified, as desired.

Figure 7:
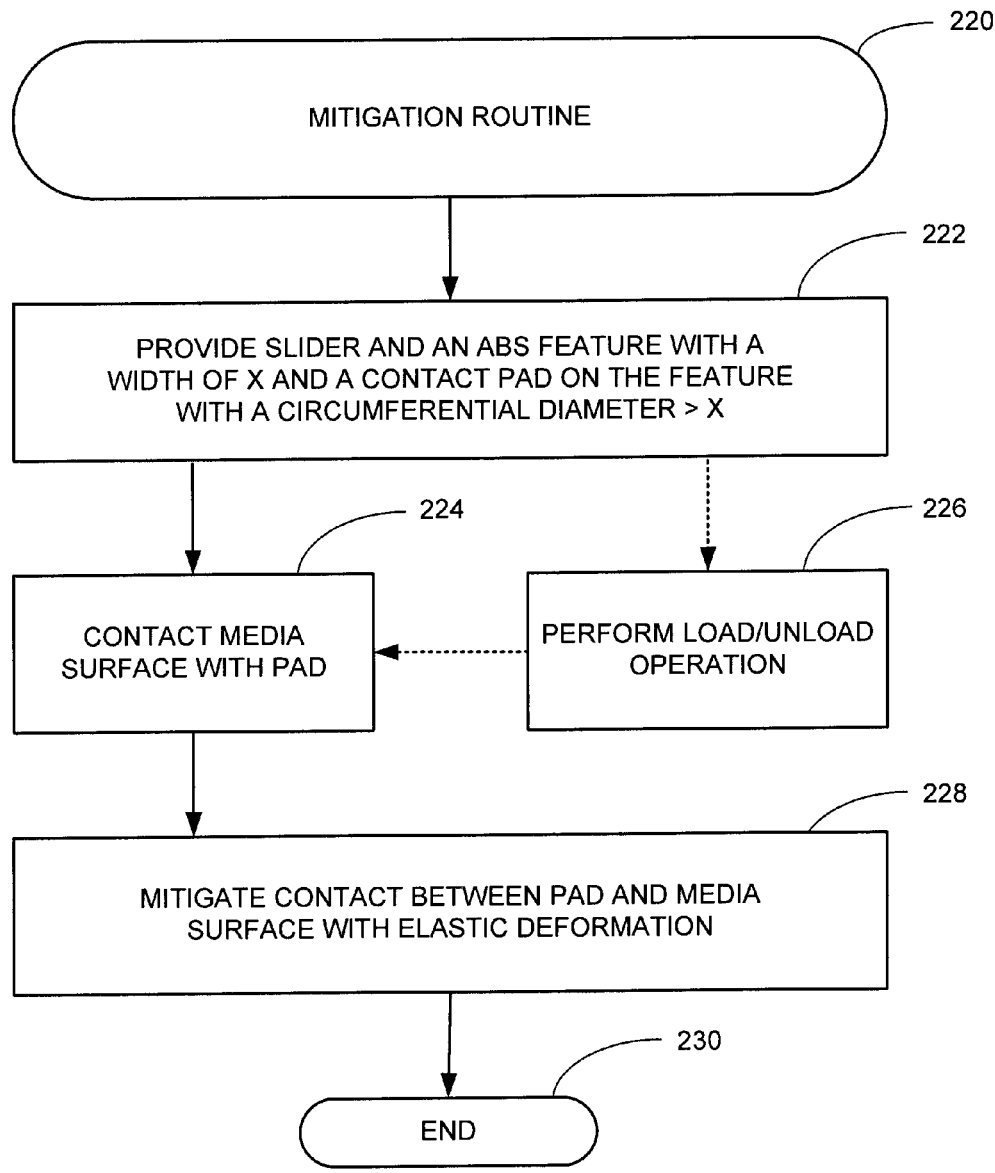
FIG. 7 provides a flowchart of an exemplary MITIGATION ROUTINE carried out in accordance with various embodiments of the present invention.

FIG. 7 provides a mitigation routine 220 conducted in accordance with various embodiments of the present invention. The routine 220 initially provides a slider at step 222 that presents a transducer and has at least one ABS feature with a pair of sidewalls an X distance apart. A pad is present on the ABS feature that has a circumferential diameter that is greater than the X distance.

The pad subsequently contacts an associated media surface in step 224. Such contact is not limited and can be any event. In some optional embodiments, a load/unload operation is conducted in step 226 before contact occurs. In other embodiments, the media surface is defined by the presence of magnetic or optical data on the surface. Additionally in various embodiments, the pad inadvertently contacts the media surface while being unloaded from a ramp structure in step 226. The contact between the pad and the media surface is mitigated in step 228 with elastic deformation.

A result of various embodiments of the mitigation routine 220 is only the elastic deformation of the pad and media surface and the complete mitigation of energy by the pad without any plastic deformation. Finally, the routine 220 ends at step 230. However, the various steps of the mitigation routine 220 are not required or limited. That is, the steps of routine 220 can be skipped, moved, or replaced without deterring from the spirit of the present invention.

It can be appreciated that the material and geometrical characteristics of the pad described in the present disclosure allows for advantageous mitigation of contact. Moreover, the various embodiments discussed herein can provide an improved head-media interaction during operation, non-operation, and positioning of data transducers. In addition, while the embodiments have been directed to contact mitigation in a data storage device, it will be appreciated that the claimed invention can readily be utilized in any number of other applications, including non-data storage device applications.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
a slider presenting a transducer, wherein the slider has at least one air bearing surface (ABS) feature comprising a pair of sidewalls spaced apart and each having a width X; and
a pad deposited with the width X on the ABS feature, wherein the pad comprises a hemispherical cross-section and has a circumferential diameter greater than width X, the pad capable of mitigating contact between the pad and a media surface with elastic deformation.

2. The apparatus of claim 1, wherein the ABS feature is a leading edge comb.

3. The apparatus of claim 1, wherein the pad mitigates contact between the slider and a media surface of a data storage disk drive by engaging in only elastic deformation.

4. The apparatus of claim 1, wherein a first plurality of pads are deposited on an ABS feature located at a leading edge of the slider.

5. The apparatus of claim 4, wherein a second plurality of pads are deposited on an ABS feature located at a trailing edge of the slider.

6. The apparatus of claim 1, wherein the pad has a continuously spherical and edgeless top surface.

7. The apparatus of claim 1, wherein the hemispherical cross-section of the pad comprises a pair of vertically extending annular sidewalls.

8. The apparatus of claim 1, wherein a secondary pad is deposited in a cavity region where the ABS feature emerges from the slider.

9. The apparatus of claim 8, wherein the secondary pad concurrently contacts a substantially vertical sidewall of the ABS feature and a substantially horizontal surface of the slider.

10. The apparatus of claim 1, wherein the pad comprises a diamond-like coating (DLC) material.

11. The apparatus of claim 10, wherein the pad is deposited on a coating layer.

12. A data storage device comprising:
a slider presenting at least one transducer, wherein the slider has at least one air bearing surface (ABS) feature comprising a pair of sidewalls spaced apart and each having a width X; and
a plurality of pads each deposited with the width X on the ABS feature, wherein each pad comprises a hemispherical cross-section and has a circumferential diameter greater than width X, the plurality of pads capable of mitigating contact between one or more pads and a media surface with elastic deformation.

13. The data storage device of claim 12, wherein each of the plurality of pads is equidistant from a center point of the slider.

14. The data storage device of claim 12, wherein a ramp is configured to provide a unloaded slider position where no transducer resides over the media surface.

15. The data storage device of claim 12, wherein the plurality of pads are positioned as parallel pairs along a longitudinal axis of the slider.

16. The data storage device of claim 12, wherein at least one of the plurality of pads extend beyond the bounds of the ABS feature.

17. The data storage device of claim 12, wherein at least two of the plurality of pads are respectively positioned on leading and trailing rails of the slider.

18. A data transducing assembly comprising:
a slider presenting at least one transducer, wherein the slider has at least one air bearing surface (ABS) feature comprising a pair of substantially vertical sidewalls spaced apart and each having a continuous width X; and
a pad deposited on a leading edge sidewall of the ABS feature, wherein the pad comprises a first and second substantially vertical pad sidewalls spaced the width X apart and a continuously curvilinear top surface configured with a circumferential diameter greater than width X to mitigate contact between the pad and a media surface with elastic deformation.

19. The data transducing assembly of claim 18, wherein the pad sidewalls have a pad size and pad shape that matches a feature size and feature shape of a sidewall of the ABS feature.

20. The data transducing assembly of claim 19, wherein the pad size and pad shape are dissimilar from the feature size and feature shape.

* * * * *